United States Patent [19]

Cody et al.

[11] Patent Number: 4,740,393

[45] Date of Patent: * Apr. 26, 1988

[54] COATING COMPOSITION CONTAINING A CALCIUM PHOSPHITE AND PROCESS FOR PROTECTING A SURFACE FROM CORROSION

[75] Inventors: Charles A. Cody, Robbinsville; Michael A. Desesa, Fair Haven; William W. Reichert, Freehold, all of N.J.

[73] Assignee: NL Chemicals, Inc., Hightstown, N.J.

[ * ] Notice: The portion of the term of this patent subsequent to Oct. 7, 2003 has been disclaimed.

[21] Appl. No.: 890,460

[22] Filed: Jul. 30, 1986

Related U.S. Application Data

[63] Continuation-in-part of Ser. No. 753,456, Jul. 10, 1985, Pat. No. 4,615,918, and a continuation-in-part of Ser. No. 884,635, Jul. 11, 1986.

[51] Int. Cl.$^4$ .............. B05D 3/02; C08K 3/00; C08K 3/18
[52] U.S. Cl. .............. 427/388.1; 106/14.34; 106/14.39; 252/389.61; 427/385.5; 427/388.2; 524/432; 524/433
[58] Field of Search .............. 524/432, 433; 427/385.5, 388.1, 388.2; 106/14.05, 14.34, 14.39; 252/389.24, 389.61

[56] References Cited

U.S. PATENT DOCUMENTS

| | | | |
|---|---|---|---|
| 2,120,213 | 6/1938 | Curtin | 148/6.5 |
| 2,544,236 | 3/1951 | Reimert et al. | 252/301.6 |
| 2,579,020 | 12/1951 | Smith | 106/288 |
| 2,597,406 | 5/1952 | Thome-Johannesen | 148/6.15 |
| 3,558,273 | 1/1971 | Beck | 23/105 |
| 3,846,148 | 11/1974 | Nordyke et al. | 106/308 B |
| 3,852,087 | 12/1974 | Nordyke et al. | 106/288 B |
| 3,869,299 | 3/1979 | Periard et al. | 106/306 |
| 3,923,712 | 12/1975 | Vickery | 106/296 |
| 3,960,611 | 6/1976 | Walker et al. | 148/6.15 R |
| 3,996,142 | 12/1976 | White et al. | 752/8.1 |
| 4,083,860 | 4/1978 | Ruf | 260/429.7 |
| 4,159,207 | 6/1979 | Nuss | 106/293 |
| 4,217,142 | 8/1980 | Mayne et al. | 106/14.36 |
| 4,294,621 | 10/1981 | Maurer et al. | 106/306 |
| 4,294,808 | 10/1981 | Wasel-Nielen et al. | 423/305 |
| 4,469,521 | 9/1984 | Salensky | 106/296 |
| 4,615,918 | 10/1986 | Reichert et al. | 427/385.5 |

FOREIGN PATENT DOCUMENTS

| | | |
|---|---|---|
| 2625401 | 12/1977 | Fed. Rep. of Germany . |
| 2656779 | 6/1978 | Fed. Rep. of Germany . |
| 2849712 | 5/1980 | Fed. Rep. of Germany . |
| 2940695 | 4/1981 | Fed. Rep. of Germany . |
| 59-24131 | 2/1984 | Japan . |

*Primary Examiner*—Thurman K. Page
*Attorney, Agent, or Firm*—Burns, Doane, Swecker & Mathis

[57] ABSTRACT

A coating composition useful for increasing the corrosion resistance of a surface is provided. The composition comprises a coating material, a first anti-corrosive agent and a second anti-corrosive agent which is calcium phosphite. The composition may also include fillers and other conventional additives. A process for protecting a surface from corrosion is also provided.

29 Claims, No Drawings

COATING COMPOSITION CONTAINING A CALCIUM PHOSPHITE AND PROCESS FOR PROTECTING A SURFACE FROM CORROSION

CROSS-REFERENCE TO RELATED APPLICATIONS

This is a continuation-in-part of pending applications Ser. No. 753,456 filed July 10, 1985 and now U.S. Pat. No. 4,615,918 and Ser. No. 884,635 filed July 11, 1986.

BACKGROUND OF THE INVENTION

1. Field of the Invention

The present invention relates to a coating composition that contains calcium phosphite as one of the anti-corrosive agents which composition protects a surface from corrosion and to a process of using the composition.

2. Description of the Prior Art

It is known in the art to provide materials in coating compositions which impart corrosion resistance to surfaces coated by the compositions. For example, in U.S. Pat. No. 3,846,148, there is disclosed composite pigments which are stated as having excellent corrosion inhibition and tannin absorptive properties. The composite pigments comprise inert silicate mineral base pigments having adhered to the particles thereof and in intimate association therewith at least one additive compound which may be a basic or hydrated metal phosphate, phosphite, borate or chromate wherein the metal is preferably calcium or magnesium.

U.S. Pat. No. 4,294,621 describes an anti-corrosive pigment having a phosphate basis. The pigment is prepared by reacting one or more calcium or magnesium compounds with phosphoric acid or acid alkali metal or ammonium phosphate by intimately mixing an aqueous suspension or solution of the reactants using a dispersing means rotating at high speed. After reaction and drying, an anti-corrosive pigment is obtained which is comprised of a homogenous mixture and/or mixed crystals of which 10 to 95 mole % is calcium hydrogen phosphate dihydrate with the balance being magnesium hydrogen phosphate trihydrate.

U.S. Pat. No. 3,395,027 discloses a coating composition, particularly for magnesium surfaces, consisting essentially of a slurry of finely divided inorganic solid particulate material in an aqueous solution containing substantial amounts of phosphate, nitrate, and dissolved metal. Typical phosphates which can be used are monobasic, dibasic and tribasic orthophosphates of magnesium, zinc, ferrous or ferric iron, calcium or alkali metals.

U.S. Pat. No. 2,120,212 relates to phosphated metal coatings wherein the phosphate is an acid phosphate of barium, strontium, calcium, magnesium, aluminum, zinc, manganese, nickel, cadmium, lead, copper, arsenic or silver.

U.S. Pat. No. 4,294,808 sets forth a process for making phosphorous-containing anti-corrosive pigments by reacting one or more compounds of magnesium, calcium, strontium, barium, zinc, aluminum, iron, chromium or manganese with an oxygen acid of phosphorous or its alkali metal or ammonium salt.

U.S. Pat. No. 4,083,860 describes metal compounds of monoesters of phosphoric acid which are useful as corrosion inhibitors, corrosion protecting films, thickeners, fungicides or biocides. The compounds may be prepared in a two-step process wherein the first step involves reacting a dialkyl phosphite with a low-molecular weight alkyl residue in a non-aqueous medium and in the absence of solvents with metal or organometallic compounds and wherein the second step involves transesterifying the metal monoalkyl esters produced in the first step to introduce a defined substituent.

OBJECTS AND SUMMARY OF THE INVENTION

Accordingly, it is a general object of the present invention to provide a novel coating composition which increases the corrosion resistance of a surface to which it is applied.

It is a more specific object of the present invention to provide a coating composition which imparts excellent corrosion protection for a surface as determined by salt fog spray and outdoor exposure tests.

It is a further object of the present invention to provide a corrosion-resisting coating composition which has excellent shelf life and thermal stability.

It is a still further object of the present invention to provide a coating composition which imparts corrosion resistance to a surface and displays excellent blister resistance, film integrity and adhesion to the surface.

It is yet further object of the present invention to provide a process for imparting corrosion resistance to a surface.

In one aspect, the present invention provides a coating composition for protecting a surface from corrosion. The composition comprises:
(a) a coating material;
(b) a first anti-corrosive agent; and
(c) a second anti-corrosive agent which is different from the first anti-corrosive agent and which is calcium phosphite.

In another aspect, the present invention provides a process for protecting a surface from corrosion. The process comprises:
(a) coating the surface with a coating composition comprising
  (i) a coating material;
  (ii) a first anti-corrosive agent; and
  (iii) a second anti-corrosive agent which is different from the first anti-corrosive agent and which is calcium phosphite; and
(b) permitting the coating to harden.

Further advantages and features of the invention as well as the scope, nature and utilization of the invention will become apparent to those skilled in the art from the description of the preferred embodiments of the invention set forth below.

DESCRIPTION OF THE PREFERRED EMBODIMENTS

As stated hereinabove, one aspect of the present invention relates to a coating composition for increasing the corrosion resistance of a surface wherein the coating composition comprises a coating material, a first anti-corrosive agent (i.e., an agent which imparts corrosion resistance properties to the composition) and a second anti-corrosive agent which is different from the first anti-corrosive agent and which is calcium phosphite.

The coating material is present in the composition in an amount ranging from about 25 to about 99% by weight, preferably from about 50 to about 95% by weight of the overall coating composition. The coating material may be any known organic solvent-based material which is not deleteriously affected by the presence of the anti-corrosive agent. Typical coating materials include oleoresinous systems, such as alkyd-based or oil/alkydbased paints, vinyl-based paints, chlorinated rubber-based paints, epoxies, silicates, polyurethanes, acrylics, phenolics, polyesters and mixtures thereof. Preferred coating materials are oleoresinous systems, exemplified by oil/alkyd systems. Oil/alkyd systems are generally based on a combination of a drying oil and an alkyd resin which is the reaction product of a polybasic acid, a polyhydric alcohol and a monobasic fatty acid or oil. The most preferred coating material is oil/alkyd-based paints, particularly wherein the ratio of oil to alkyd resin is 1:1 by weight.

As is well known in the art, the coating materials based on organic solvents decrease in weight upon drying due to the evaporation of the organic solvent. Typically, the loss in weight of the fully dried material is from about 10 to about 25% (and in some instances more such as up to about 70%) of the initial weight.

The coating material may also be any latex-based paint or any solvent-free coating material which is not deleteriously affected by the presence of the anti-corrosive agent. Typical solvent-free coating materials include oleoresinous systems, such as alkyd-based paints and oil/alkyd-based paints, epoxies, polyesters and mixtures thereof. As is apparent from the discussion set forth above, such types of solvent-free coating materials are variations of the coating materials which are formulated with organic solvents. The coating material may additionally be a solvent-free urethane-based paint, either alone or in combination with other solvent-free coating materials, or powder coating materials which are typically electrostatically applied, thermosetting coatings based on systems such as polyethylene, polyvinyl chloride, epoxy resin, polyamide resin, cellulose butyrate and polyester resin.

As used herein, the term "solvent-free" encompasses those coating compositions which may contain small amounts of solvent used to incorporate any of the ingredients into the composition. However, the term does not encompass typical solvent-based systems described above which experience about a 10 to 25% loss of weight (and in some instances more) due to the evaporation of the organic solvent.

Preferred solvent-free coating materials are oleoresinous systems, exemplified by oil/alkyd systems, epoxy systems and urethane systems. As mentioned previously, oil/alkyd systems are generally based on a combination of a drying oil and an alkyd resin which is the reaction product of a polybasic acid, a polyhydric alcohol and a monobasic fatty acid or oil. Epoxy systems are generally based on bifunctional diglycidyl ethers cross-linked with an amine or polyamine while urethane systems are generally based on the polymer reaction product of a polyol cross-linked with a multifunctional isocyanate. Polyester systems are typically based on the reaction product between polyols and difunctional carboxylic acids cross-linked with a reactive monomer such as styrene.

The first anti-corrosive agent is present in an amount ranging from about 0.75 to about 74.75%, preferably from about 5 to about 50% by weight of the total coating composition and is a material or combination of materials which chemically inhibits the corrosion reaction at a metal surface either directly (due to their properties) or indirectly (due to the properties of their reaction products). The first anti-corrosive agent may be pigmentary or non-pigmentary and includes zinc hydroxy phosphite (such as prepared in accordance with U.S. Pat. Nos. 4,386,059 and 3,917,804, the contents of which are incorporated by reference), zinc phosphate, basic lead silicochromate (such as prepared in accordance with U.S. Pat. No. 3,118,780, the contents of which are incorporated by reference), red lead, blue lead, basic zinc molybdate, zinc chromate, basic calcium zinc molybdate, calcium borosilicate, calcium phosphosilicate, calcium barium phosphosilicate, calcium strontium phosphosilicate, barium metaborate, basic aluminum zinc phosphate, basic zinc molybdenum phosphate, zinc salts of organic nitrogen compounds, zinc ferrite, calcium ferrite, zinc barium phosphate, zinc aluminum triphosphate, zinc potassium chromate, zinc tetroxy chromate, strontium chromate, barium chromate, dibasic lead phosphite, lead phosphosilicates, chromium phosphate, calcium plumbate, zinc dust, zinc oxide, aluminum phosphate, iron phosphate and mixtures thereof.

The first anti-corrosive agent may also be a calcined mixture of magnesium oxide and zinc oxide or a calcined mixture of magnesium oxide, zinc oxide and calcium oxide as set forth in aforementioned allowed application Ser. No. 753,456 and application Ser. No. 884,635, filed on July 11, 1986 and entitled "A Solvent-Free Coating Composition and Process For Protecting a Surface From Corrosion", the contents of which are incorporated by reference or a mixture of either or both of these materials with any of the materials mentioned above.

Preferred first anti-corrosive agents are a calcined mixture of magnesium oxide and zinc oxide or a calcined mixture of magnesium oxide, zinc oxide and calcium oxide, zinc hydroxy phosphite, zinc phosphate, basic lead silicochromate, red lead, zinc potassium chromate, zinc tetroxy chromate, calcium borosilicate, basic zinc molybdate, zinc oxide, calcium phosphosilicate and mixtures thereof.

Most preferred first anti-corrosive agents are a calcined mixture of magnesium oxide and zinc oxide or a calcined mixture of magnesium oxide, zinc oxide and calcium oxide, zinc hydroxy phosphite, basic lead silicochromate, red lead, zinc potassium chromate, calcium borosilicate, basic zinc molybdate and mixtures thereof.

Representative sources of the first anti-corrosive agent and the tradenames or grades thereof are as follows:

| Manufacturer | Tradename or Grade | Generic Name |
| --- | --- | --- |
| NL Chemicals Inc. | Nalzin 2 | Zinc hydroxy phosphite |
| | Nalzin EC | Zinc Magnesium Calcium Phosphite complex |
| Sherwin Williams | Molywhite 101 | Basic zinc molybdate |
| | 331 | Basic zinc molybdate |
| | ZNP | Basic zinc molybdate |
| | 212 | Basic calcium zinc molybdate |

-continued

| Manufacturer | Tradename or Grade | Generic Name |
|---|---|---|
| | MZA | Basic calcium zinc molybdate |
| Hammond Lead | Halox CW-22 | Calcium borosilicate |
| | CW-221 | Calcium borosilicate |
| | CW-291 | Calcium borosilicate |
| | CW-2230 | Calcium borosilicate |
| | CW-111 | Calcium phosphosilicate |
| | BW-111 | Calcium barium phosphosilicate |
| | BW-191 | Calcium barium phosphosilicate |
| | SW-111 | Calcium strontium phosphosilicate |
| | BW-100 | Calcium/barium phosphosilicate |
| | ZX-111 | Zinc phosphosilicate |
| Buckman | Busan 11-M1 | Barium metaborate |
| | Butrol 22 | Modified barium metaborate |
| Heubach | Heucophos ZPA | Basic aluminum zinc phosphate |
| | ZPO | Organic treated basic zinc phosphate |
| | ZMP | Basic zinc molybdenum phosphate |
| | ZP 10 | Zinc phosphate |
| | ZBZ | Zinc phosphate chromate |
| Reichard Coulston | Zinc Phosphate 317 | Zinc phosphate |
| Davis Mineral Pigments Corporation | Zinc Phosphate 0852 | Zinc phosphate |
| Lansco | 235 Zinc Phosphate | Zinc phosphate |
| Wayne | 222 Zinc Phosphate | Zinc phosphate |
| BASF | Sicor ZNP/M | Zinc phosphate |
| | ZNP/S | Zinc phosphate |
| | Sicorin RZ | Zinc salt of organic nitro compound |
| Mobay/Bayer | Anticor 70 | Zinc ferrite |
| | Anticor 71 | Calcium ferrite |
| Davis Mineral Pigments Corporation | Phos-Plus JO866 | Zinc barium phosphate |
| Teikoku Kako | K-White | Zinc aluminum triphosphate |
| Dominion Color | DCC 1088 | Zinc molybdate |
| BASF | Sicor NOP | Modified zinc phosphate |
| | SOP | Modified zinc phosphate |
| NL Chemicals, Inc. | Oncor M50 | Basic lead silicochromate |
| | F31 | Basic lead silicochromate |
| Hammond | Red Lead - 85% | Red Lead (85% $Pb_3O_4$; 15% PbO) |
| | 95% | Red Lead (95% $Pb_3O_4$; 5% PbO) |
| | 97% | Red Lead (97% $Pb_3O_4$; 3% PbO) |
| | 98% | Red Lead (98% $Pb_3O_4$; 2% PbO) |
| Heubach | Heuconin 5 | Low dust Red lead |
| | Blue Lead, Sublimed | Basic lead sulfate |
| Davis Mineral Pigments Corporation | Zinc yellow J1310 | Zinc potassium chromate |
| | Zinc yellow 533 WJ | Zinc potassium chromate |
| Heubach | Zinc yellow Y-539-D | Zinc potassium chromate |
| Wayne | 21PX Zinc yellow | Zinc potassium chromate |
| | 233 Basic zinc yellow | Zinc potassium chromate |
| Lansco | Zinc yellow 231 | Zinc potassium chromate |
| | Basic zinc yellow 232 | Zinc tetroxy chromate |
| Dominion Color | Zinc yellow 1084 | Zinc potassium chromate |
| | Zinc yellow ED 1085 | Zinc potassium chromate |
| Ciba Geigy | X 2865 Strontium Chromate | Strontium chromate |
| Davis Mineral Pigments Corporation | J 1365 Strontium Chromate | Strontium chromate |
| Lansco | 272 Strontium Chromate | Strontium chromate |
| Wayne | 176 Strontium Chromate | Strontium chromate |
| Davis Mineral Pigments Corporation | Barium Chromate 1353 | Barium chromate |
| Hammond | | Dibasic lead phosphite |
| New Jersey Zinc | 22,44 | Standard grade zinc dust |
| | 122,222 | High purity zinc dust |
| | 422,444 | Fine standard zinc dust |
| | 54,64 | Superfine zinc dust |
| | 84 | Ultrafine zinc dust |

To determine if a particular material is suitable as the first anti-corrosive agent, it can be incorporated into a standard 1:1 oil alkyd paint formulation which is prepared according to the following formulation:

| Ingredient | Generic Name | Manufacturer | Pounds[1] |
|---|---|---|---|
| Aroplaz 1266-M70 | Long Oil Alkyd Resin | Spencer Kellogg | 210.6 |
| Amsco 66/3 | Mineral Spirits | Union Oil | 26.0 |
| Anti-corrosive agent | | | |
| Nytal 300 | Talc | R. T. Vanderbilt | 23.8 (23.27 − x) |
| Pfizer R-2899 | Red iron Oxide | Pfizer | 116.0 |
| Bentone SD-1 | Organophilic Clay | NL Chemicals, Inc. | 12.0 |
| Disperse for 15 Minutes at High Speed and add: | | | |
| Raw Linseed Oil | Raw Linseed Oil | Spencer Kellogg/ NL Chemicals, Inc. | 147.4 |
| Amsco 66/3 | Mineral Spirits | Union Oil | 126.5 |

-continued

| Ingredient | Generic Name | Manufacturer | Pounds[1] |
| --- | --- | --- | --- |
| 6% Cobalt Nuxtra | 6% Cobalt Naphthenate | Nuodex | 2.6 |
| 4% Calcium Nuxtra | 4% Calcium Naphthenate | Nuodex | 14.0 |
| 6% Zirconium Nuxtra | 6% Zirconium Naphthenate | Nuodex | 9.4 |
| Exkin No. 2 | Methyl Ethyl Ketoxime | Nuodex | 1.8 | where $x = 200/d$ and d is the anti-corrosive agent density in lb/gal. However, when the anti-corrosive agent is omitted, x is zero.
[1]Basic formulation; test composition may be prepared with smaller amounts, but proportional to those set forth.

The paint prepared with the above formulation is allowed to equilibrate 24 hours before being applied to polished cold rolled steel test panels described in ASTM D609-73, Section 4.3, Type 2 entitled "Preparation of Steel Panels for Testing Paint, Varnish, Lacquer, and Related Products." The paint is applied in two equal coats to give a total dry film thickness of 75 microns. The paint is allowed to dry 24 hours between coats and one week before testing. An "X" is scribed through the paint to the steel substrate using a tungsten carbide tipped cutting tool. Each line scribed measures 3 inches; the "X" is situated over the lower half surface of the 4 inch × 8 inch panels.

The prepared panels, after drying, are exposed to a 6% salt fog (NaCl) atmosphere at 97° F. in accordance with testing procedures outlined in ASTM B117-73 entitled "Method of Salt Spray (Fog) Testing". After 300 hours salt fog exposure, the panels are removed and the overall rusting is evaluated by the rating system described in ASTM D610-68 entitled "Evaluating Degree of Rusting on Painted Steel Surfaces".

A further oil/alkyd paint formulation is prepared which is identical to the formulation set forth above except that the anti-corrosive agent is omitted and the amount of Nytal 300 is increased to 553.8 pounds (or a proportional amount if different quantities are used) to prepare the formulation. This formulation is subjected to the same ASTM test procedures. If, according to ASTM D610-68, the paint formulation containing the anti-corrosive agent exhibits an average overall rust rating (e.g., for at least 2 panels) that is at least 2 units higher than the paint formulation without the anti-corrosive agent the material may be used as the first anti-corrosive agent of the present invention. As is apparent, the test panels for the respective formulations may be tested separately or together.

The second anti-corrosive agent used in the present invention is different than the first anti-corrosive agent (i.e., the chemically active portion thereof) and is calcium phosphite. The calcium phosphite is present in an amount ranging from about 0.25 to about 74.25% of the total coating composition such that the total combined weight of the first anti-corrosive agent and the second anti-corrosive agent (calcium phosphite) is in the range of from about 1.0 to about 75% by weight of the coating composition. Preferably, the second anti-corrosive agent is present in an amount ranging from about 1.0 to about 15% by weight of the coating composition such that the total combined weight of the first and second anti-corrosive agents is in the range of from about 6 to about 65% by weight of the coating composition.

Although calcium phosphite by itself provides some anti-corrosive activity, when combined with the previously described first anti-corrosive agent, a degree of anti-corrosive activity which is significantly improved over the individual anti-corrosive agents may be achieved, such as determined by underfilm corrosion evaluation. To facilitate achievement of this enhanced anti-corrosive performance, the weight ratio of the first anti-corrosive agent to the second anti-corrosive agent typically is in the range of from about 100:1 to about 1:100, preferably from about 100:20 to about 100:80 and most preferably from about 100:25 to about 100:50.

The calcium phosphite used in the present invention can be either crystalline or amorphous and either hydrated ($CaHPO_3 \cdot xH_2O$) or anhydrous ($CaHPO_3$). Anhydrous calcium phosphite is prepared by heating $CaHPO_3 \cdot xH_2O$ to 250° C. The preferred form of calcium phosphite is crystalline $CaHPO_3 \cdot H_2O$ or $CaHPO_3 \cdot 1.5\text{-}H_2O$.

The calcium phosphite can be prepared by mixing equimolar amounts of $H_3PO_3$ and $CaO$ or other calcium salts, such as calcium hydroxide or calcium carbonate, in a manner known to those of ordinary skill in the art or can be obtained via the process disclosed in U.S. Pat. Nos. 4,330,515 and 4,380,531, the contents of which are incorporated by reference.

The calcium phosphite may be directly incorporated into the coating composition or may be first dry blended with the first anti-corrosive agent which blend is then added to the coating composition.

To the coating composition may also be added fillers which may or may not have pigmentary properties. Such fillers are exemplified by talc, silica, barium sulfate, calcium sulfate, calcium carbonate, calcium silicate, titanium dioxide, iron oxides, mica, aluminum silicate, clay and mixtures thereof.

If used, the fillers are present in an amount ranging from about 1 to about 74% by weight, preferably from about 15 to about 35% by weight of the coating composition with the proviso that the total amount of (1) first anti-corrosive agent, (2) the second anti-corrosive agent, and (3) the filler should not exceed about 75% by weight of the total coating composition. However, the amount of this filler does not include the amount of filler which may already be present in the coating material such as those commercially available.

The fillers may be separately added to the coating composition or may be wet or dry blended with the first and/or second anti-corrosive agent before it is added to the composition.

The coating composition of the present invention may further include other known materials, such as driers, antioxidants, gellants, fungicides, etc. in known amounts suitable for their intended function, and solvents for such materials. Thus, for example, an organic salt (e.g., an octoate or naphthenate) of a metal (e.g., cobalt, calcium, zirconium, manganese, lead, bismuth or antimony) available from Nuodex Corporation under the name "Nuxtra" can be used as a drier in order to catalyze the oxidative polymerization of unsaturated prepolymers. Similarly, an anti-oxidant, such as methyl ethyl ketoxime available under the name "Exkin No. 2" from Nuodex Corporation, can be added to prevent surface oxidation in the coating composition.

As an illustrative method of preparing a typical coating composition, the calcium phosphite can be first wet (i.e., with a small amount of a non-reactive liquid such as the resin or solvent which may be present in the coating material) or can be dry blended for a sufficient period of time (e.g., up to about 2 hours) with the other materials (e.g., the filler and/or the first anti-corrosive agent and/or the conventional materials) and this mixture may then be mixed into the coating material. Alternatively, the calcium phosphite may be added to the coating material separate from the other components in any order of addition under conditions sufficient to achieve a composition suitable for coating a surface.

The surfaces to which the coating composition may be applied may be composed of any material or combination of materials which are subjected to an environment in which they will eventually corrode. Typical materials include metallic surfaces, especially ferrous metal surfaces exemplified by hot rolled steel, cold rolled steel, galvanized iron and mixtures thereof. Such materials are commonly used in outdoor environments wherein they are exposed to rain, wind and sun and, if near bodies of salt water, may also be exposed to salt water spray. Similar high-humidity or otherwise aggressive atmospheres may also be found in certain indoor environments.

The coating compositions of the present invention are applied to the aforementioned surfaces and are permitted to harden by drying and/or curing to obtain a thickness in the range of from about 0.5 to about 20 mils, preferably from about 1 to about 10 mils. Due to the presence of the first anti-corrosive agent and the second anti-corrosive agent (calcium phosphite), the hardened coating provides excellent corrosion protection for the surfaces when they are exposed to salt fog sprays. The coating compositions additionally display excellent blister resistance, film integrity and adhesion to the surface.

The degree of anti-corrosion performance of the coating composition of the present invention can be measured by three standard ASTM methods, namely, ASTM D610-68 entitled "Evaluating Degree of Rusting on Painted Steel Surfaces", ASTM D1654-79a (Procedure A) entitled "Evaluation of Painted or Coated Specimens Subjected to Corrosive Environments", and ASTM D714-56 entitled "Evaluating Degree of Blistering of Paints". The coating composition can also be tested in accordance with ASTM method B117-73 entitled "Method of Salt Spray (Fog) Testing" wherein the composition is applied onto steel panels which are scribed and subjected to salt fog spray. Scribing is achieved by scratching an "X" in the coating through to bare steel using a tungsten carbide cutting tool. The amount of rusting at the scribe is assessed on a scale of 0-10 where 10 is no corrosion and 0 is complete failure where the whole area associated with the scribe is rusted. Ratings of 5 and above are acceptable for anti-corrosive compositions tested in accordance with the procedure of ASTM D-1654-79 (Procedure B) when using a 1:1 oil/alkyd coating material which is applied to cold rolled steel panels to a dry film thickness of 75 microns and subjected to salt spray for 300 hours. The oil/alkyd coating which does not contain an anti-corrosive agent will deteriorate to a 1 rating within 300 hours of salt fog exposure.

Scribe creepage or underfilm corrosion is assessed in accordance with ASTM D1654-79a (Procedure A) on a scale of 0-10 where 10 is no corrosion and 0 is 5/8 inch or more creepage from the scribe. The test panels and conditions are identical to those set forth in the preceding paragraph. Ratings of 3 or above are acceptable for anti-corrosive compositions.

Blistering in the coatings is assessed in accordance with ASTM D714-56. This method describes blister size as numbers 2, 4, 6, 8, and 10, where 2 is a large blister ¼ inch or larger in diameter, 8 is a small blister less than 1/16 inch in diameter and 10 is the absence of blistering. Blister density is described as D=dense, MD=medium dense, M=medium, and F=few.

EXAMPLES 1-7

Crystalline calcium phosphite monohydrate and a first anti-corrosive agent are added to a standard 1:1 oil/alkyd paint formulation and a salt fog evaluation (ASTM Method B117-73) is conducted to demonstrate the anti-corrosive properties of coating composition.

The 1:1 oil/alkyd paint formulation is prepared according to the following formula:

| Ingredient | Generic Name | Manufacturer | Pounds[1] |
| --- | --- | --- | --- |
| Aroplaz 1266-M70 | Long Oil Alkyd Resin | Spencer-Kellogg/ NL Chemicals, Inc. | 210.6 |
| Amsco 66/3 | Mineral Spirits | Union Oil | 26.0 |
| First Anti-corrosive agent | | | 200.0 |
| Calcium Phosphite | | | 50.0 |
| Nytal 300 | Talc | R. T. Vanderbilt | 23.8 (23.27 − x) − 58.3 |
| Pfizer R-2899 | Red Iron Oxide | Pfizer | 116.0 |
| Bentone SD-1 | Organophilic Clay | NL Chemicals, Inc. | 12.0 |
| Disperse for 15 Minutes at High Speed and add: | | | |
| Raw Linseed Oil | Raw Linseed Oil | Spencer-Kellogg/ NL Chemicals, Inc. | 147.4 |
| Amsco 66/3 | Mineral Spirits | Union Oil | 126.5 |
| 6% Cobalt Nuxtra | 6% Cobalt Naphthenate | Nuodex | 2.6 |
| 4% Calcium Nuxtra | 4% Calcium Naphthenate | Nuodex | 14.0 |
| 6% Zirconium Nuxtra | 6% Zirconium Naphthenate | Nuodex | 9.4 |
| Exkin No. 2 | Methyl Ethyl Ketoxime | Nuodex | 1.8 | where $x = 200/d$ and d is the anti-corrosive agent density in lb/gal. However, where no anti-corrosive agent is employed (i.e., the blank), x is zero.

[1]Basic formulation; test composition may be prepared with different amounts, but proportional to those set forth.

The following first anti-corrosive agents are evaluated:

| Example | Anti-Corrosive Agent | Tradename | Manufacturer | Density (lbs/gal) |
|---|---|---|---|---|
| 1 | Red Lead | Red Lead 95% | Hammond Lead | 74.5 |
| 2 | Zinc Potassium Chromate | Zinc Yellow J1310 | Davis/Mineral Pigments Corporation | 29.2 |
| 3 | Basic Lead Silicochromate | Oncor M50 | NL Chemicals, Inc. | 34.1 |
| 4 | Basic Zinc Molybdate | Molywhite 101 | Sherwin Williams | 42.1 |
| 5 | Zinc Hydroxy Phosphite | Nalzin 2 | NL Chemicals, Inc. | 32.5 |
| 6 | Calcium Borosilicate | Halox CW 291 | Halox Division of Hammond Lead | 22.5 |
| 7 | Blank | — | — | — |

The paints prepared with the above formulation are allowed to equilibrate 24 hours before being applied to polished cold rolled steel test panels described in ASTM D609-73, Section 4.3, Type 2 entitled "Preparation of Steel Panels for Testing Paint, Varnish, Lacquer, and Related Products". Paints are applied in two equal coats to give a total dry film thickness of 75 microns. The paints are allowed to dry 24 hours between coats and one week before testing. An "X" is scribed through the paint to the steel substrate using a tungsten carbide tipped cutting tool. Each line scribed measures 6 inches; the "X" is situated over the entire surface of the 4 inch × 8 inch panels.

The prepared panels, after drying, are exposed to a 6% salt fog (NaCL) atmosphere at 97° F. in accordance with testing procedures outlined in ASTM B117-73. After 150, 325 and 600 hours, the panels are inspected and evaluated for blistering in accordance with ASTM D714-56 and rusting at the scribe without stripping the coating. The rating system employed for rusting is on a scale of 1-10 with 10 being no apparent corrosion and 1 being total failure.

After 875 hours salt fog exposure, the panels are removed and the paint is stripped from the panels in order to evaluate underfilm corrosion in accordance with ASTM D1654-79a (Procedure A) entitled "Evaluation of Painted or Coated Specimens Subjected to Corrosive Environments". The amount of corrosion creepage from the scribe is evaluated by the rating system described in ASTM D1654-79a; the overall rusting at areas distant from the scribe is evaluated by the rating system described in ASTM D610-68 (Evaluating Degree of Rusting on Painted Steel Surfaces). The results are summarized in Tables 1 and 2.

COMPARATIVE EXAMPLES A-G

Examples 1-7 are repeated except that the calcium phosphite is omitted and the amount of Nytal 300 is increased by 58.3 pounds (or a proportional amount if different quantities are used to prepare the formulation) to maintain the pigment volume concentration constant.

The results of the tests are also summarized in Tables 1 and 2.

TABLE 1

| Sample | Salt Fog Exposure Results (875 hours) | |
|---|---|---|
| | Creepage From Scribe | Underfilm Rusting (Panel) |
| Example 1 | 6 | 5 |
| Comparative Example A | 0 | 1 |
| Example 2 | 9 | 10 |
| Comparative Example B | 8 | 10 |
| Example 3 | 4 | 3 |
| Comparative Example C | 1 | 2 |
| Example 4 | 8 | 10 |
| Comparative Example D | 3 | 10 |
| Example 5 | 8 | 10 |
| Comparative Example E | 5 | 10 |
| Example 6 | 6 | 5 |
| Comparative Example F | 0 | 2 |
| Example 7 | 0 | 1 |
| Comparative Example G | 0 | 1 |

EXAMPLES 8-10

Crystalline calcium phosphite monohydrate and an anti-corrosive agent are added to a standard 1:1 oil-/alkyd paint formulation and a salt fog evaluation (ASTM Method B117-73) is conducted to demonstrate the anti-corrosive properties of the resulting compositions.

The 1:1 oil/alkyd paint formulation is prepared as decribed in Examples 1-7, with the following anti-corrosive agent being evaluated:

| Example | Anti-Corrosive Agent | Tradename | Manufacturer | Density (lb/gal) |
|---|---|---|---|---|
| 8 | Zinc Phosphate | Sicor ZNP/M | BASF | 28.4 |
| 9 | Modified Barium Metaborate | Butrol 22 | Buckman Laboratories | 31.0 |
| 10 | Zinc Oxide | AZO 77 | ASARCO | 46.6 |

The properties of the above formulations are tested by coating the formulations on cold-rolled steel panels and subjecting the coated panels to the test conditions and tests after 150, 325 and 600 hours as set forth above. The test results are summarized in Table 2.

COMPARATIVE EXAMPLES H-J

Examples 8-10 are repeated except that the calcium phosphite is omitted and the amount of Nytal 300 is increased by 58.3 pounds (or a proportional amount if different quantities are used to prepare the formulation) to maintain the pigment volume concentration constant. The results of the tests are also summarized in Table 2.

TABLE 2

| | Salt Fog Exposure Results of Unstripped Painted Panels | | | | | |
|---|---|---|---|---|---|---|
| | 150 Hours | | 325 Hours | | 600 Hours | |
| Sample Description | Blister-ing* | Rust-ing | Blister-ing* | Rust-ing | Blister-ing | Rust-ing |
| Example 1 | 8MD | 9 | 6M | 8 | 4M | 6 |
| Comparative Example A | 8MF | 9 | 6M | 7 | 4M | 6 |
| Example 2 | 10 | 9 | 8F | 7 | 8M | 7 |
| Comparative | 10 | 9 | 8F | 7 | 8F | 7 |

TABLE 2-continued

Salt Fog Exposure Results of Unstripped Painted Panels

| Sample Description | 150 Hours Blister-ing* | Rust-ing | 325 Hours Blister-ing* | Rust-ing | 600 Hours Blister-ing | Rust-ing |
|---|---|---|---|---|---|---|
| Example B | | | | | | |
| Example 3 | 6MF | 7 | 6MF | 6 | 6M | 6 |
| Comparative Example C | 6F | 8 | 6M | 6 | 4M | 5 |
| Example 4 | 8F | 7 | 6F | 7 | 6M | 7 |
| Comparative Example D | 8F | 7 | 4F | 6 | 4MF | 6 |
| Example 5 | 8F | 7 | 6MF | 7 | 6M | 7 |
| Comparative Example E | 10 | 7 | 6F | 7 | 4F | 7 |
| Example 6 | 6VF | 6 | 4VF | 5 | 4F | 5 |
| Comparative Example F | 6F | 6 | 6M | 6 | 4D | 4 |
| Example 7 | 4M | 5 | 4M | 5 | 4D | 4 |
| Comparative Example G | 4M | 5 | 4D | 2 | 4D | 2 |
| Example 8 | 6MD | 6 | 6MD | 5 | 6D | 5 |
| Comparative Example H | 6D | 8 | 4D | 5 | 4D | 4 |
| Example 9 | 6VF | 6 | 6F | 6 | 6F | 6 |
| Comparative Example I | 8M | 7 | 6MF | 6 | 6MF | 6 |
| Example 10 | 8F | 8 | 6F | 8 | 6F | 8 |
| Comparative Example J | 8F | 7 | 6F | 7 | 6F | 6 |

*The frequency rating system of that described in ASTM Method D714-56 is further qualified here by "V" which stands for very, e.g., VF—very few.

EXAMPLES 11-15

Crystalline calcium phosphite monohydrate and a first anti-corrosive agent are added to an acrylic latex formulation and a salt fog evaluation (ASTM Method B117-73) is conducted to demonstrate the anti-corrosive properties of calcium phosphite.

The latex paint formulation is prepared according to the following formula:

| Ingredient | Generic Name | Manufacturer | Pounds[1] |
|---|---|---|---|
| Water | Water | | 120.0 |
| Cellosize QP-4400 | Thickener | Union Carbide | 1.0 |
| Nopco NXZ | Defoamer | Diamond Shamrock | 2.5 |
| Mix until dissolved, then add: | | | |
| QR-681-M | Dispersant | Rohm & Haas | 22.0 |
| AMP-95 | Stabilizer | Int'l. Minerals & Chemicals | 3.0 |
| NH4OH, 28% | Ammonium Hydroxide | | 1.0 |
| Premix, then add: | | | |
| Bekosol 10-908 (100% solids) | Safflower Oil Alkyd | Reichhold Chemicals | 48.0 |
| CTA-639 | Emulsifying Agent | GAF | 4.0 |
| 6% Co Nuxtra | Drier | Nuodex | 1.4 |
| 6% Nuxtra | Drier | Nuodex | 1.6 |
| Mix at low speed for 5 minutes, then add: | | | |
| First Anti-Corrosive Agent | | | 100.0 |
| Calcium Phosphite | Calcium Phosphite | | 20.0 |
| Red Iron Oxide R-2899 | Red Iron Oxide, 0.3 micron | Pfizer | 50.0 |
| 325 Water Ground Mica | Mica, 25.0 micron | English Mica | 28.0 |
| Atomite | Calcium Carbonate, 3.0 micron | Thompson Weinman | 22.5 (10.84 − x) − 22.0 |
| Grind on high speed disperser, then letdown: | | | |
| Rhoplex/Primal MV-23 | Acrylic Latex | Rohm & Haas | 470.0 |
| Ethylene Glycol | Ethylene Glycol | | 28.0 |
| Water | Water | | 25.0 |
| Texanol | Coalescent | Eastman Kodak | 6.0 |
| Skane M-8 | Mildewcide | Rohm & Haas | 2.0 |
| Raybo 60 | Stabilizer | Raybo | 12.0 |
| QR-708 | Thickener | Rohm & Haas | 4.0 |
| NH4OH, 28% | Ammonium Hydroxide | | 6.0 | where $x = 100/d$, and d is the anti-corrosive agent density in lb/gal. However, where no anti-corrosive agent is employed (i.e., the blank), x is zero.
[1] Basic formulation; test composition may be prepared with different amounts, but proportional to those set forth.

The following first anti-corrosive agents are evaluated:

| Example | Anti-Corrosive Agent | Tradename | Manufacturer | Density (lb/gal) |
|---|---|---|---|---|
| 11 | Zinc Hydroxy Phosphite | Nalzin 2 | NL Chemicals, Inc. | 32.5 |
| 12 | Modified Barium Metaborate | Butrol 22 | Buckman Laboratories | 31.0 |
| 13 | Calcium Borosilicate | Halox CW 291 | Halox Div. of Hammond Lead | 22.5 |
| 14 | Basic Lead Silicochromate | Oncor M50 | NL Chemicals, Inc. | 34.1 |
| 15 | Blank | — | — | — |

The properties of the above formulations are tested in accordance with the procedures:

| Test | ASTM Method |
|---|---|
| Salt Fog Exposure | B117-73 |
| Rusting (Panel) | D610-68 |
| Blistering | D714-56 |

Rusting at the scribe is also determined by examining the coated panels and rating them on a scale of 1-10 with 10 being no apparent corrosion and 1 being total failure. The test results, obtained with the aforementioned tests on cold rolled steel, are summarized in Table 3.

COMPARATIVE EXAMPLES K-O

Examples 11-15 are repeated except that the calcium phosphite is omitted and the amount of Atomite is increased by 22 pounds (or a proportionate amount if different quantities are used to prepare the formulation) to maintain the pigment volume concentration constant. The results of the tests are also summarized in Table 3.

TABLE 3

Salt Fog Exposure Results (475 Hours)

| Sample Description | Blistering* Scribe | Blistering* Panel | Rusting Scribe | Rusting Panel |
|---|---|---|---|---|
| Example 11 | 10 | 10 | 9 | 10 |
| Comparative Example K | 6F | 10 | 8 | 10 |
| Example 12 | 6F | 6F | 6 | 8 |
| Comparative Example L | 6F | 6F | 6 | 8 |
| Example 13 | 6VF | 6MF | 4 | 8 |
| Comparative Example M | 6F | 4M | 4 | 8 |
| Example 14 | 6VF | 6VF | 5 | 10 |
| Comparative Example N | 6VF | 6VF | 5 | 8 |
| Example 15 | 4M | 4M | 4 | 6 |
| Comparative Example O | 4D | 4D | 4 | 7 |

*The frequency rating system of that described in ASTM Method D714-56 is further qualified here by "V" which stands for very, e.g., VF—very few.

EXAMPLES 16-17

Crystalline calcium phosphite monohydrate and an anti-corrosive agent are added to a standard 1:1 oil-/alkyd paint formulation.

The 1:1 oil/alkyd paint formulation is prepared according to the following formula:

| Ingredient | Generic Name | Manufacturer | Formulation A (pounds)[1] | Formulation B (pounds)[1] |
|---|---|---|---|---|
| Aroplaz 1266-M70 | Long Oil Alkyd Resin | Spencer Kellogg/ NL Chemicals, Inc. | 210.6 | 210.6 |
| Amsco 66/3 | Mineral Spirits | Union Oil | 26.0 | 26.0 |
| First Anti-Corrosive Agent | | | 200.0 | |
| First Anti-Corrosive Agent | | | | 200.0 |
| Calcium Phosphite | | | 50.0 | 50.0 |
| Nytal 300 | Talc | R. T. Vanderbilt | 283.2 | 431.0 |
| Pfizer R-2899 | Red Iron Oxide | Pfizer | 116.0 | 116.0 |
| Bentone SD-1 | Organophilic Clay | NL Chemicals, Inc. | 12.0 | 12.0 |
| Disperse for 15 minutes at high speed to obtain a Hegman Gauge Reading of 4 N.S. and add: | | | | |
| Raw Linseed Oil | Raw Linseed Oil | Spencer Kellogg/ NL Chemicals, Inc. | 147.4 | 147.4 |
| Amsco 66/3 | Mineral Spirits | Union Oil | 126.5 | 126.5 |
| 6% Cobalt Nuxtra | 6% Cobalt Naphthenate | Nuodex | 2.6 | 2.6 |
| 4% Calcium Nuxtra | 4% Calcium Naphthenate | Nuodex | 14.0 | 14.0 |
| 6% Zirconium Nuxtra | 6% Zirconium Naphthenate | Nuodex | 9.4 | 9.4 |
| Exkin No. 2 | Methyl Ethyl Ketoxime | Nuodex | 1.8 | 1.8 |

[1]Basic formulation; test composition may be prepared with different amounts, but proportional to those set forth.

The following first anti-corrosive agents are evaluated:

| Example | Anti-Corrosive Agent | Tradename | Manufacturer |
|---|---|---|---|
| 16 (Formulation A) | Calcium Borosilicate | Halox CW 291 | Halox Division of Hammond Lead |
| 17 (Formulation B) | Red Lead | Red Lead 95% | Hammond Lead |

The paints prepared with the above formulation are allowed to equilibrate 24 hours before being applied to polished cold rolled steel test panels described in ASTM D609-73, Section 4.3, Type 2 entitled "Preparation of Steel Panels for Testing Paint, Varnish, Lacquer, and Related Products". Paints are applied in two equal coats to give a total dry film thickness of 75 microns. The paints are allowed to dry 24 hours between coats and one week before testing. An "X" is scribed through the paint to the steel substrate using a tungsten carbide tipped cutting tool. Each line scribed measures 3 inches; the "X" was situated over half of the surface of the 4 inch×8 inch panels.

The prepared panels, after drying, are exposed to a 6% salt fog (NaCL) atmosphere at 97° F. in accordance with testing procedures outlined in ASTM B117-73. After 425 hours salt fog exposure, the panels are removed and the overall rusting on the unscribed portion of the panels is evaluated by the rating system described in ASTM D610-68 (Evaluating Degree of Rusting on Painted Steel Surfaces). Rusting at the scribed portion of the panels is determined by examining the coated panel and rating it on a scale of 1-10 with 10 being no apparent corrosion and 1 being total failure.

The amount of blistering on the panel is evaluated by the rating system described in ASTM D714-56 (Evaluating Degree of Blistering of Paints). The paint is then stripped from the panels in order to evaluate underfilm corrosion in accordance with ASTM D1654-79a entitled "Evaluation of Painted or Coated Specimens Subjected to Corrosive Environments." The amount of corrosion creepage from the scribe is evaluated by the rating system described in ASTM D1654-79a (Procedure A). The overall rusting on the stripped metal surface is evaluated by the rating system described in ASTM D610-68. These results are summarized in Table 4.

COMPARATIVE EXAMPLES P and R

Examples 16 and 17 are repeated except that the calcium phosphite is omitted and the amount of Nytal 300 is increased 58.8 pounds in Formulation A and 59 pounds in Formulation B (or a proportional amount if different quantities are used to prepare the formulation) to maintain the pigment volume concentration constant. The results of the tests are also summarized in Table 4.

COMPARATIVE EXAMPLES S and T

Examples 16 and 17 are repeated except that the calcium phosphite is replaced with calcium hydrogen phosphate ($CaHPO_4 \cdot 2H_2O$). The results of the tests are also summarized in Table 4.

COMPARATIVE EXAMPLES U and V

Examples 16 and 17 are repeated except that the calcium phosphite is replaced with $CaHPO_4 \cdot 2H_2O$(90.7 mole %)/MgHPO$_4$.3H$_2$O (9.3 mole %) mixture. The results of the tests are also summarized in Table 4.

COMPARATIVE EXAMPLES W and X

Examples 16 and 17 are repeated except that the calcium phosphite is replaced with MgHPO$_4$.3H$_2$O. The results of the tests are also summarized in Table 4.

COMPARATIVE EXAMPLES Y and Z

Examples 16 and 17 are repeated except that the calcium phosphite is replaced with Zn$_3$(PO$_4$)$_2$.4H$_2$O. The results of the tests are also summarized in Table 4.

TABLE 4

| | | Salt Fog Exposure Results (425 Hours) | | | | | |
|---|---|---|---|---|---|---|---|
| | | Unstripped Panel | | | | Stripped Panel | |
| | | Blistering* | | Rusting | | Scribe | Rusting |
| Sample | Anti-Corrosive Agents | Scribe | Panel | Scribe | Panel | Creepage | (Panel) |
| Example 16 | CaHPO$_3$/Calcium Borosilicate | 6VF | 6MF | 7 | 8 | | 5 |
| Comparative Example P | Calcium Borosilicate | 2M | 4M | 6 | 7 | | 3 |
| Comparative Example S | CaHPO$_4$.2H$_2$O/Calcium Borosilicate | 4D | 4D | 3 | 3 | | 2 |
| Comparative Example U | [CaHPO$_4$.2H$_2$O(90.7 mole %)/ MgHPO$_4$.3H$_2$O(9.3 mole %)]/ Calcium Borosilicate | 4M | 4M | 6 | 3 | | 4 |
| Comparative Example W | MgHPO$_4$.3H$_2$O/Calcium Borosilicate | 4M | 4D | 6 | 3 | | 3 |
| Comparative Example Y | Zn$_3$(PO$_4$)$_2$.4H$_2$O/ Calcium Borosilicate | 4M | 6M | 7 | 4 | | 3 |
| Example 17 | CaHPO$_3$/Red Lead | 8M | 10 | 8 | 10 | 9 | |
| Comparative Example R | Red Lead | 4M | 8F | 6 | 10 | 4 | |
| Comparative Example T | CaHPO$_4$.2H$_2$O/Red Lead | 4D | 6VF | 6 | 10 | 2 | |
| Comparative Example V | [CaHPO$_4$.2H$_2$O(90.7 mole %)/ MgHPO$_4$.3H$_2$O(9.3 mole %)]/ Red Lead | 4D | 10 | 6 | 10 | 0 | |
| Comparative Example X | MgHPO$_4$.3H$_2$O/Red Lead | 6M | 6F | 5 | 10 | 5 | |
| Comparative Example Z | Zn$_3$(PO$_4$)$_2$.4H$_2$O/Red Lead | 6M | 10 | 6 | 10 | 3 | |

*The frequency rating system of that described in ASTM Method D714-56 is further qualified here by "V" which stands for very, e.g., VF = very few.

The salt fog results demonstrate that blistering and rust creepage from the scribe is more evident in those formulations where CaHPO$_3$ is replaced with CaHPO$_4$ or related phosphate-containing compositions.

The invention being thus described and exemplified, it will be obvious that the invention may be varied in many ways. Such variations are not to be regarded as a departure from the spirit and scope of the invention and all such modifications are intended to be included within the scope of the following claims.

What is claimed is:

1. A coating composition for protecting a surface from corrosion comprising:
   (a) a coating material;
   (b) a first anti-corrosive agent; and
   (c) a second anti-corrosive agent which is different from the first anti-corrosive agent and which is calcium phosphite.

2. The coating composition of claim 1 wherein the coating material is present in an amount ranging from about 25 to about 99% by weight of the coating composition.

3. The coating composition of claim 2 wherein the coating material is present in an amount ranging from about 50 to about 95% by weight of the coating composition.

4. The coating composition of claim 1 wherein the coating material is selected from the group consisting of alkyd based-paints, oil/alkyd-based paints, vinyl-based paints, chlorinated rubber-based paints, epoxies, silicates, polyurethanes, acrylics, phenolics, polyesters and mixtures thereof.

5. The coating composition of claim 4 wherein the coating material is an oil/alkyd-based paint.

6. The coating composition of claim 1 wherein the coating material is a latex-based paint.

7. The coating composition of claim 1 wherein the first anti-corrosive agent is present in an amount ranging from about 0.75 to about 74.75% by weight of the coating composition.

8. The coating composition of claim 7 wherein the first anti-corrosive agent is present in an amount ranging from about 5 to about 50% by weight of the coating composition.

9. The coating composition of claim 1 wherein the first anti-corrosive agent is selected from the group consisting of zinc hydroxy phosphite, zinc phosphate, basic lead silicochromate, red lead, blue lead, basic zinc molybdate, zinc chromate, basic calcium zinc molybdate, calcium borosilicate, calcium phosphosilicate, calcium barium phosphosilicate, calcium strontium phosphosilicate, barium metaborate, basic aluminum zinc phosphate, basic zinc molybdenum phosphate, zinc salts of organic nitrogen compounds, zinc ferrite, calcium ferrite, zinc barium phosphate, zinc aluminum triphosphate, zinc potassium chromate, zinc tetroxy chromate, strontium chromate, barium chromate, dibasic lead phosphite, lead phosphosilicates, chromium phosphate, calcium plumbate, zinc dust, zinc oxide, aluminum phosphate, iron phosphate and mixtures thereof.

10. The coating composition of claim 1 wherein the first anti-corrosive agent is selected from the group consisting of a calcined mixture of magnesium oxide and zinc oxide, a calcined mixture of magnesium oxide, zinc oxide and calcium oxide, zinc hydroxy phosphite, zinc phosphate, basic lead silicochromate, red lead, zinc potassium chromate, zinc tetroxy chromate, calcium borosilicate, basic zinc molybdate, zinc oxide, calcium phosphosilicate and mixtures thereof.

11. The coating composition of claim 1 wherein the first anti-corrosive agent is selected from the group consisting a calcined mixture of magnesium oxide and zinc oxide, a calcined mixture of magnesium oxide, zinc oxide and calcium oxide, zinc hydroxy phosphite, basic lead silicochromate, red lead, zinc potassium chromate, calcium borosilicate, basic zinc molybdate and mixtures thereof.

12. The coating composition of claim 1 wherein the second anti-corrosive agent is present in an amount ranging from about 0.25 to about 74.25% by weight of the coating composition.

13. The coating composition of claim 12 wherein the second anti-corrosive agent is present in an amount ranging from about 1.0 to about 15% by weight of the coating composition.

14. The coating composition of claim 1 wherein the second anti-corrosive agent is crystalline calcium phosphite.

15. The coating composition of claim 14 wherein the second anti-corrosive agent is hydrated crystalline calcium phosphite.

16. The coating composition of claim 1 wherein the weight ratio of the first anti-corrosive agent to the second anti-corrosive agent is in the range of from about 100:1 to about 1:100.

17. The coating composition of claim 16 wherein the weight ratio of the first anti-corrosive agent to the second anti-corrosive agent is in the range of from about 100:20 to about 100:80.

18. The coating composition of claim 17 wherein the weight ratio of the first anti-corrosive agent to the second anti-corrosive agent is in the range of from about 100:25 to about 100:50.

19. The coating composition of claim 1 wherein the coating composition further comprises filler in an amount ranging from about 1 to about 74% by weight of the coating composition.

20. The coating composition of claim 19 wherein the filler is present in an amount ranging from about 15 to about 35 by weight of the coating composition.

21. The coating composition of claim 19 wherein the filler is selected from the group consisting of talc, silica, barium sulfate, calcium sulfate, calcium carbonate, calcium silicate, titanium dioxide, iron oxides, mica, aluminum silicate, clay and mixtures thereof.

22. The coating composition of claim 19 wherein the total amount of the first anti-corrosive agent, the second anti-corrosive agent and the filler is not more than 75% by weight of the coating composition.

23. A process for protecting a surface from corrosion comprising:
 (a) coating the surface with a coating composition comprising:
  (i) a coating material;
  (ii) a first anti-corrosive agent; and
  (iii) a second anti-corrosive agent which is different from the first anti-corrosive agent and which is calcium phosphite; and
 (b) permitting the coating to harden.

24. The process of claim 23 wherein the hardened coating composition has a thickness of from about 0.5 to about 20 mils.

25. The process of claim 23 wherein the hardened coating composition has a thickness of from about 1 to about 10 mils.

26. The process of claim 23 wherein the coating material is an organic solvent based coating material and, upon hardening, the coating composition exhibits a weight loss of from about 10 to about 25% by weight.

27. The process of claim 23 wherein the surface is a ferrous metal surface.

28. The process of claim 27 wherein the surface is selected from the group consisting of hot rolled steel, cold rolled steel, galvanized iron and mixtures thereof.

29. The process of claim 21 wherein the coating material is a solvent-free coating material.

* * * * *